Oct. 24, 1967  N. KONDUR, JR  3,348,770
ACCOUNTING MACHINE READ-IN DEVICE
Filed April 4, 1966  5 Sheets-Sheet 1

INVENTOR.
NICHOLAS KONDUR JR.
BY
*Wallace P. Lamb*
ATTORNEY.

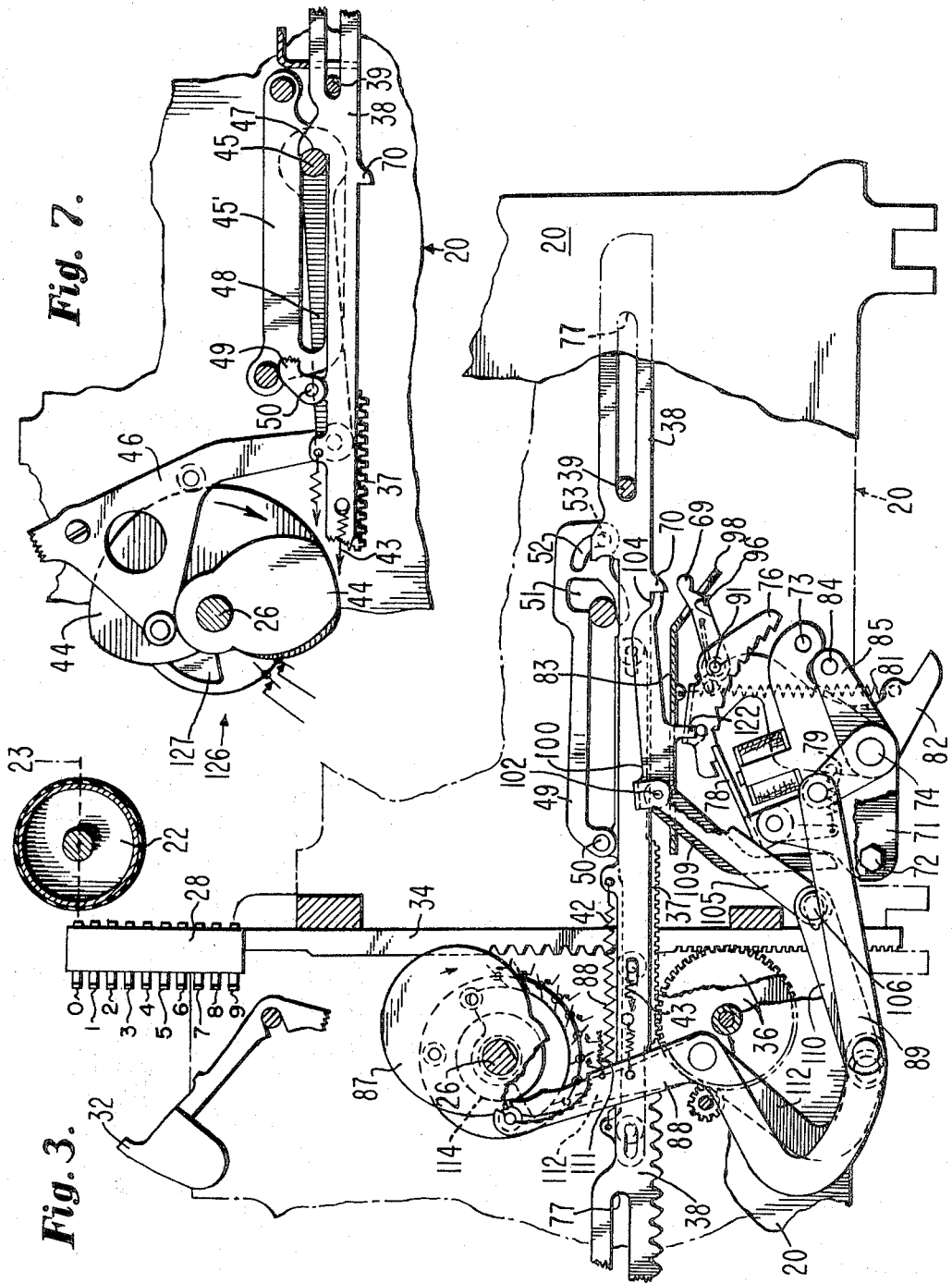

Oct. 24, 1967
N. KONDUR, JR
3,348,770
ACCOUNTING MACHINE READ-IN DEVICE
Filed April 4, 1966
5 Sheets-Sheet 3
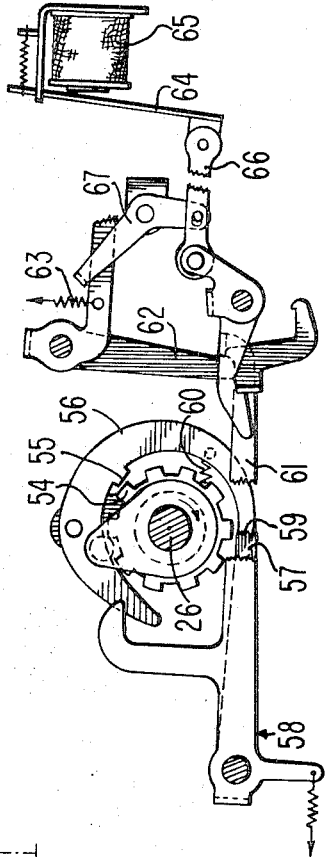
Fig. 5.
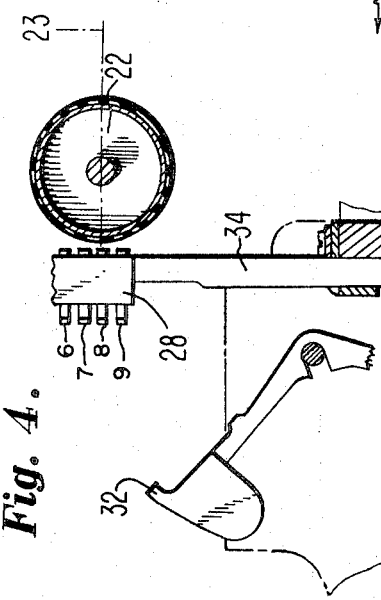
Fig. 4.
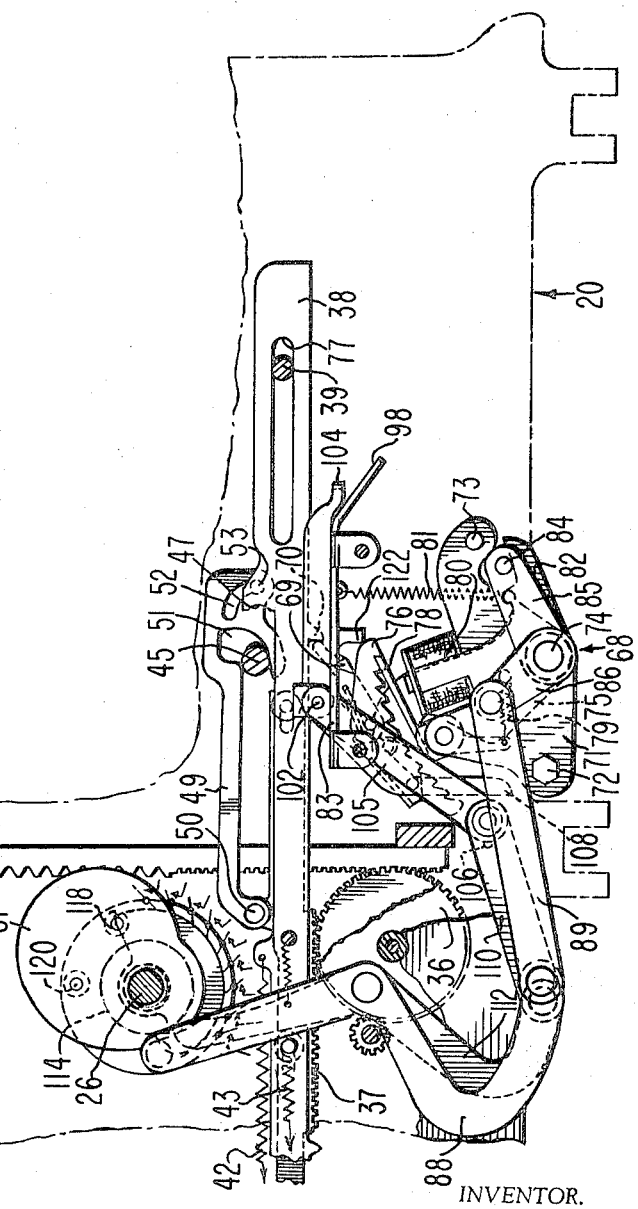
INVENTOR.
NICHOLAS KONDUR JR.
BY
*Wallace P. Lamb*
ATTORNEY.

Oct. 24, 1967  N. KONDUR, JR  3,348,770
ACCOUNTING MACHINE READ-IN DEVICE
Filed April 4, 1966  5 Sheets-Sheet 4

INVENTOR.
NICHOLAS KONDUR JR.
BY
*Wallace P. Lamb*
ATTORNEY.

United States Patent Office

3,348,770
Patented Oct. 24, 1967

3,348,770
ACCOUNTING MACHINE READ-IN DEVICE
Nicholas Kondur, Jr., Northville, Mich., assignor to Burroughs Corporation, Detroit, Mich., a corporation of Michigan
Filed Apr. 4, 1966, Ser. No. 540,035
4 Claims. (Cl. 235—61)

This invention relates generally to business machines and particularly to information read-in devices therefor.

As is well known, certain types of business machines have been used to receive information from a source, such as a computer, to record such information, or print it or both. The system for operatively connecting the computer to the business machine includes a read-in device for stopping slide members of the business machine in number representative positions corresponding to signals from the computer. To stop the slide members in the required positions, it has been the practice to provide them with teethlike abutments representative of the digits 0 to 9 and to provide an electrically operated stop member to engage the selected one of the abutments while the slide members are in motion. This requires an almost perfect synchronized timing of the slide and stop members and is objectionable since either could be accidentally restrained for one reason or another, such as by the presence of foreign matter causing the parts to bind with accompanying malfunction of the read-in operation.

Accordingly, it is the principal object of the invention to provide an improved read-in device and operating mechanism therefor in which the above mentioned objection is obviated.

Another object of the invention is to provide an improved read-in device which operates to preset an amount rack stop member to avoid the need of critical synchronization with the amount rack.

A further object of the invention is to provide the above mentioned presettable stop member without detracting from the operation of the machine.

Other objects of the invention will become apparent from the following description, taken in connection with the accompanying drawings in which:

FIG. 3 is a view similar to FIG. 1 illustrating the positions certain operating parts of the apparatus assume in the reading into the printer of the digit "0";

FIG. 4 is another view, similar to FIG. 1, illustrating the positions the operating parts assume in the operation of reading the digit "8" into the printer;

FIG. 5 is a vertical cross sectional view partly in elevation with parts broken away of a cyclically operable clutch and operator therefor;

FIG. 7 is a broken vertical sectional view partly in elevation, taken along the line 7—7 of FIG. 6;

Figures 1, 2:
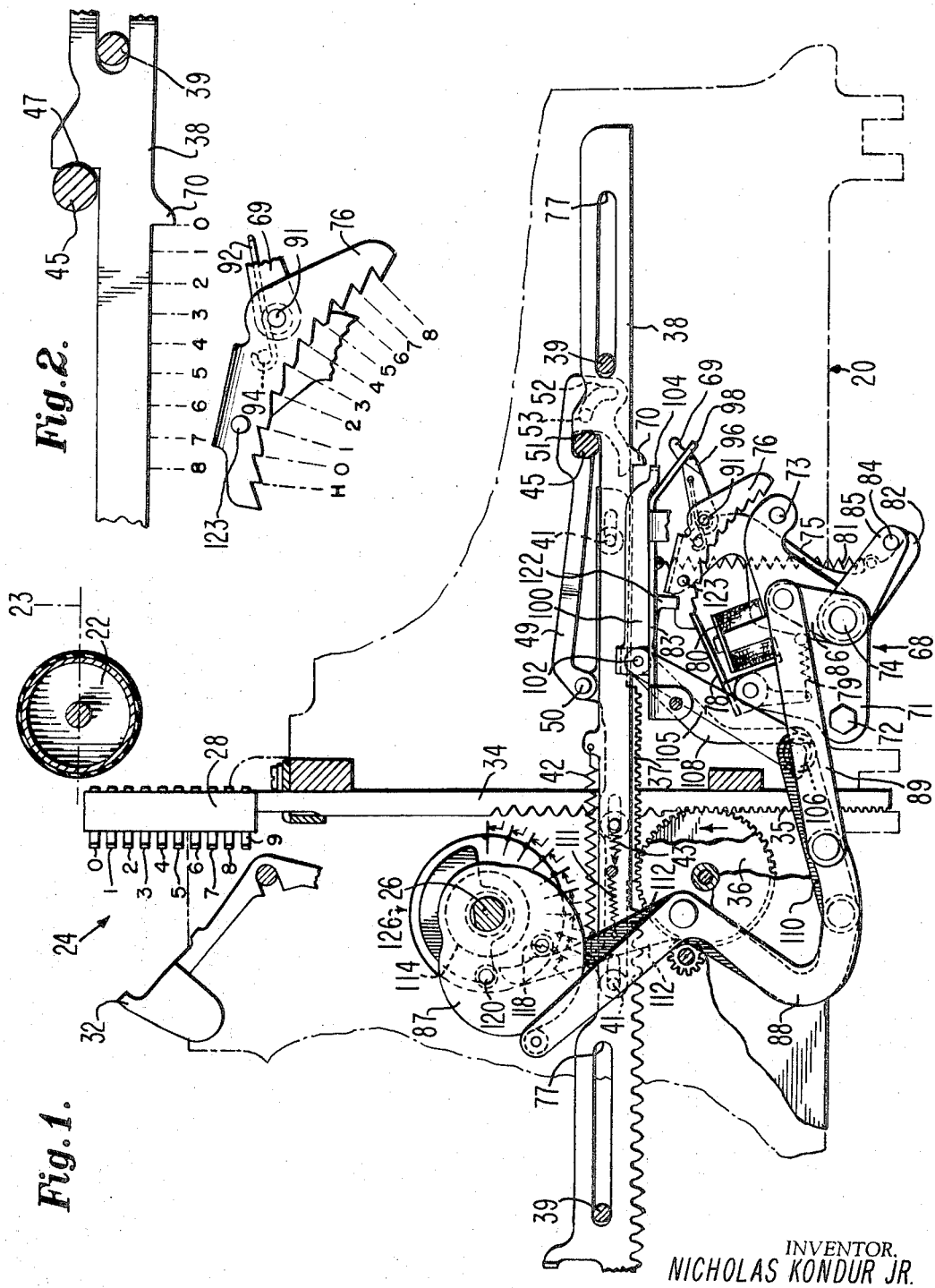
FIG. 1 is a broken vertical sectional view partly in elevation of a printing apparatus including my improved amount read-in device with the operating parts shown in their home positions.
FIG. 2 is an enlarged detail fragmentary view of certain related parts of the apparatus.
Figure 8:
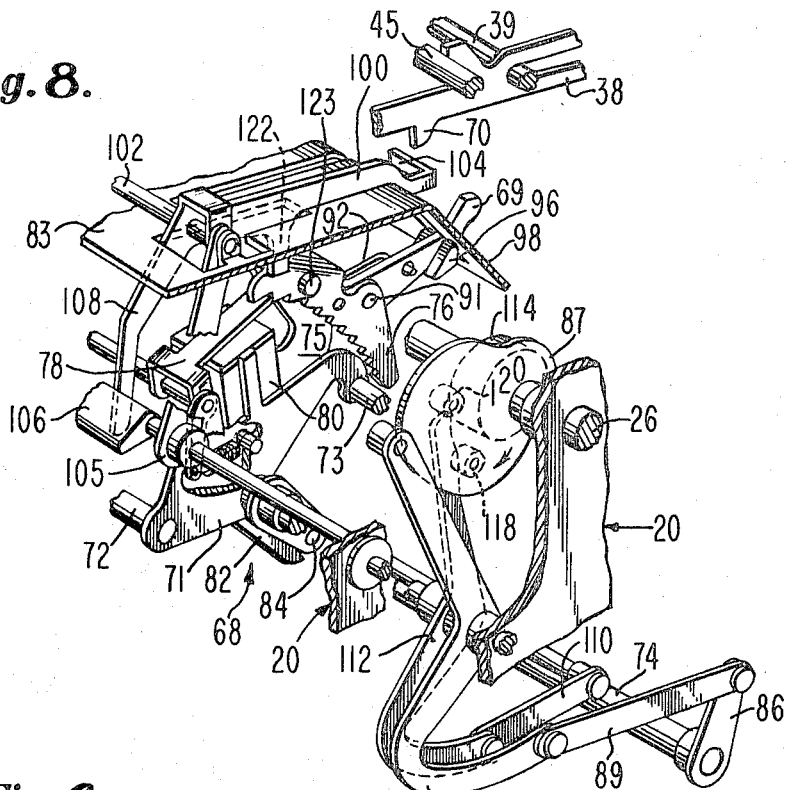
FIG. 8 is a perspective view with parts broken away.
Figure 6:
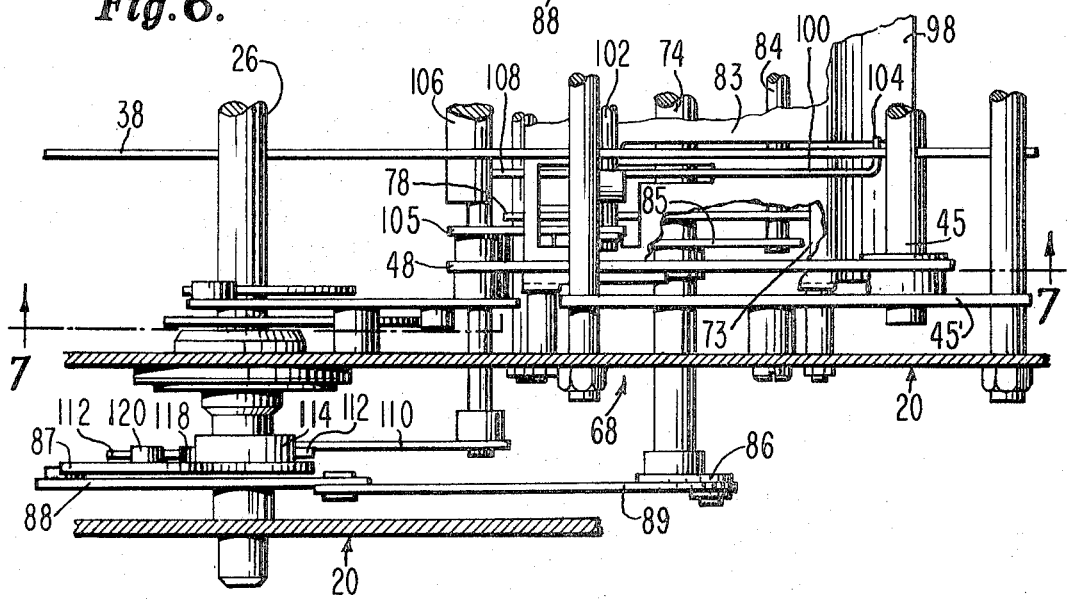
FIG. 6 is a fragmentary horizontal sectional view.

Referring to the drawings by characters of reference, the numeral 20 designates the supporting frame of a printing apparatus having a carriage mounted platen 22, printing mechanism 24 and a cyclically operable camshaft 26. Such printing apparatus has parallel banks of like mechanisms (one for each column or denomination), but the present disclosure is limited to a single bank for simplicity, convenience of the description and because a single bank of the mechanism completely illustrates the invention.

Forwardly of the platen 22, the printing mechanism includes a vertically positionable print head 28 which carries vertically spaced apart print elements corresponding respectively to the digits 0 to 9 of the decimal system. Mounted forwardly of the print head 28 there is a print hammer 32 positioned to strike that one of the print elements which is positioned at the print line 23 of the platen 22. As is well known, the print hammer 32 is operated from the camshaft 26 at about 180° of a cycle of operation thereof, as will be understood from a reference to the patent to Thomas M. Butler, No. 2,629,549, issued Feb. 24, 1953 for Automatic Function Control Mechanism for Accounting Machines.

The print head 28 is mounted on the upper end of a vertically movable bar 34 which has gear rack teeth 35 in mesh with a pinion gear 36 which in turn is in mesh with a horizontal gear rack 37, carried by a differentially positionable slide member 38. The slide member 38 has the usual horizontal slots to receive stationary supporting rods 39 on which the slide member 38 is supported for limited forward and rearward movement. Similarly, the rack 37 is mounted for horizontal sliding movement on the slide member 38, the rack 37 having laterally extending pins 41 engaging in slots in the slide member 38. A tension spring 42 has one end connected to the rack 37 and the other end is connected to the slide member 38, urging the rack and slide member in opposite directions such that normally they move together as a unit. A tension spring 43 is anchored at one end thereof and the other end of the spring is attached to a stud on the slide member 38 to urge the latter forwardly. Normally, the slide member 38 is held in the rearward or "home" position by cams 44, on the camshaft 26, connected to a cross bail 45 by a cam follower 46 and a connecting link 48, as shown in FIG. 7. The bail 45 abuts a forwardly facing shoulder 47 on the slide member 38, in home position, to restrain the spring 43.

As shown in FIGS. 1, 3 and 4 a pawl 49 has a forward end pivoted, as at 50, to the rack 37 and, rearwardly of the pivot, has a slot 51 to receive the bail 45. Rearwardly of the slot 51, the pawl is provided with an arcuate cam slot 52 which receives a pin 53, affixed to and extending laterally of the slide member 38. The cam slot 52 curves upwardly and forwardly and the horizontal distance between the centers of radii of the opposite arcuate ends of the slot 52 determines the relative movement of the rack 37 to the slide member 38 which is the required movement for raising the print head 28 to position the "0" print element at the print line.

In FIG. 5 there is shown a well known clutch for connecting the camshaft 26 to a motor driven shaft (not shown), the clutch being of the one revolution type which is shown and described in detail in the aforementioned Butler patent. In general, the clutch includes a toothed clutch component 54 cooperable with a tooth 55 of a clutch component 56. An arm 57 of a pivotal bail 58 normally abuts the clutch component 56, as at 59, to hold the clutch component retracted against the force of a spring 60 which is tending to engage the clutch components 54 and 55. Another arm 61 of the bail 58 is supported near its free end by a latch lever 62, biased by a spring 63 into holding relation with the latch arm 61. An electrically operated actuator or clapper 64 of a solenoid 65 is provided to release the latch arm 62 and thus initiate a cycle of operation of the camshaft 26, the clapper being connected to the latch arm 62 by link 66 and a lever 67. Thus, it will be apparent that upon energization of the solenoid 65 the latch lever 62 will be pivoted clockwise which will release the clutch component 56 to effect a cycle of operation of the camshaft 26.

In accordance with my invention, I provide a read-in device, designated generally by the numeral 68, having a stop member 69 which is presettable for engagement by a downwardly extended abutment 70 on the slide member 38 so as to stop the slide member in the required position. The read-in device 68 is mounted on a bracket 71 which, in turn, is mounted on the side plates of the frame structure 20 by cross rods 72 and 73. Journaled in the frame structure and in the bracket 71 there is a rotatable shaft 74 and pivotal on the shaft there is an upwardly extending arm 75. At its upper end, beneath the slide member 38, the arm 75 has a laterally offset arcuate rack 76 provided with downwardly directed spaced apart abutments which are respectively representative of the amount rack positions 0 to 8. An abutment for digit "9" is not required since the "9" digit is obtained by positioning the guide rods 39 as stop members to stop the slide member 38 in the "9" position when the rear ends 77 of the guide member slots engage the supporting rods 39.

An electrically operated stop member or solenoid clapper 78 normally engages the home position abutment "H", the clapper being moved to said position by a spring 79 upon de-energization of a solenoid 80. Upon energization of the solenoid 80, the clapper 78 is retracted and the arm 75 is pivoted counterclockwise by a coil spring 81 which has a lower end attached to an arm 82 of lever 75 and an upper end anchored to a fixed guide plate 83. The arm 82 engages a stud 84 on another arm 85 which is affixed to shaft 74, and also affixed to shaft 74 there is a lever arm 86 which is operatively connected to a cam 87 on the camshaft 26 by a cam follower 88 and a link 89. Thus, on a cycle of operation of the camshaft 26, the lever 86 is pivoted counterclockwise, as seen in FIG. 1, and rotates the shaft 74, and consequently the lever arm 85, counterclockwise which allows the spring 81 to pivot the arm 75 in the same directon, provided, of course, that the clapper 78 has been retracted. This action moves the abutment members 0 to 8 arcuately and in a generally forward direction over the clapper 78.

Carried by the arm 75 is the stop member 69 which is pivoted on the arcuate rack 76 of the arm by a pin 91. A torque spring 92 has a convolution thereof around the pin 91 with one end of the spring abutting a stud 94 on the arcuate rack 76 and the other end of the spring engaging in an aperture in the stop member arm, the spring urging the stop member 69 in a counterclockwise direction as viewed in FIGS. 1 and 2. A pair of bearing members 96 on opposite sides of the stop member 69 are held by the spring 92 against the underside of an inclined portion 98 of the guide plate 83, the inclined portion 98 extending downwardly and rearwardly from the guide plate proper, as shown.

A second stop member or arm 100 is provided solely for stopping the amount rack 38 in its "0" position and is pivoted on a fixed transverse shaft 102 above the guide plate 83. Extending rearwardly from its pivot 102, the stop arm 100 normally lies horizontally on the top of plate 83, as shown in FIG. 1. A rear end portion of the stop arm 100 overlies the inclined portion 98 of the guide plate 83 and has a laterally extending projection 104, beneath the slide member 38, in position, on upward movement thereof, for engagement by the shoulder 70 on the slide member 38. Also pivoted on the fixed shaft 102 there is shown, one of two oppositely positioned rocker arms 105 which at their lower ends support a transverse striker bail 106 to strike a downwardly extending arm 108 which is integral with the "0" stop arm 100 so as to pivot the stop arm counterclockwise to its rack stopping position shown in FIG. 3. Each of the rocker arms 105 is operatively connected by a link 110 to a cam follower lever 112 which is urged by a spring 111 toward a hub 114, affixed onto the camshaft 26. Secured to one side of the cam 84 there is a pair of actuating abutments or rollers 118 and 120 in angularly spaced apart relationship to pivot the cam follower 112 and thus rock the "0" stop arm 100. A depending lug 122 on the "0" stop arm 100 extends through a clearance aperture in the guide plate 83 and when the digit "0" is to be printed, a stud 123 on the arcuate rack 76 stops under the lug 122 in engagement therewith to hold the stop arm 100 in its "up" or stop position shown in FIG. 3. In the read-in operation of digits other than "0," the stop arm 100 pivots to its stop position to permit the stud 124 to clear the lug 122, but returns immediately so as to be out of the way of the slide member abutment 70.

Any suitable electrical system and controls may be used with my read-in device, such as the system and controls disclosed in the patent to Robert S. Bradshaw et al. No. 2,822,752, issued Feb. 11, 1958, for differential Type Setting and Resetting Means or the patent to Martin Siegel, No. 3,149,225, issued Sept. 15, 1964 for Electromechanical Read-In Apparatus. As is well known, in systems such as is shown by Bradshaw, electrical pulses from a computer effect the closing of selected ones of switches of a matrix, the circuits and the selected one of each column of switches being closed upon the initiation of a cycle of operation whereupon the selected ones of solenoids respectively holding the read-in devices inactive are energized to release such devices. Also in such systems, a timer switch operated by and in synchronization with the machine cycle of operation, functions to deenergize the solenoids to stop the amount racks in the desired positions.

Figure 9:
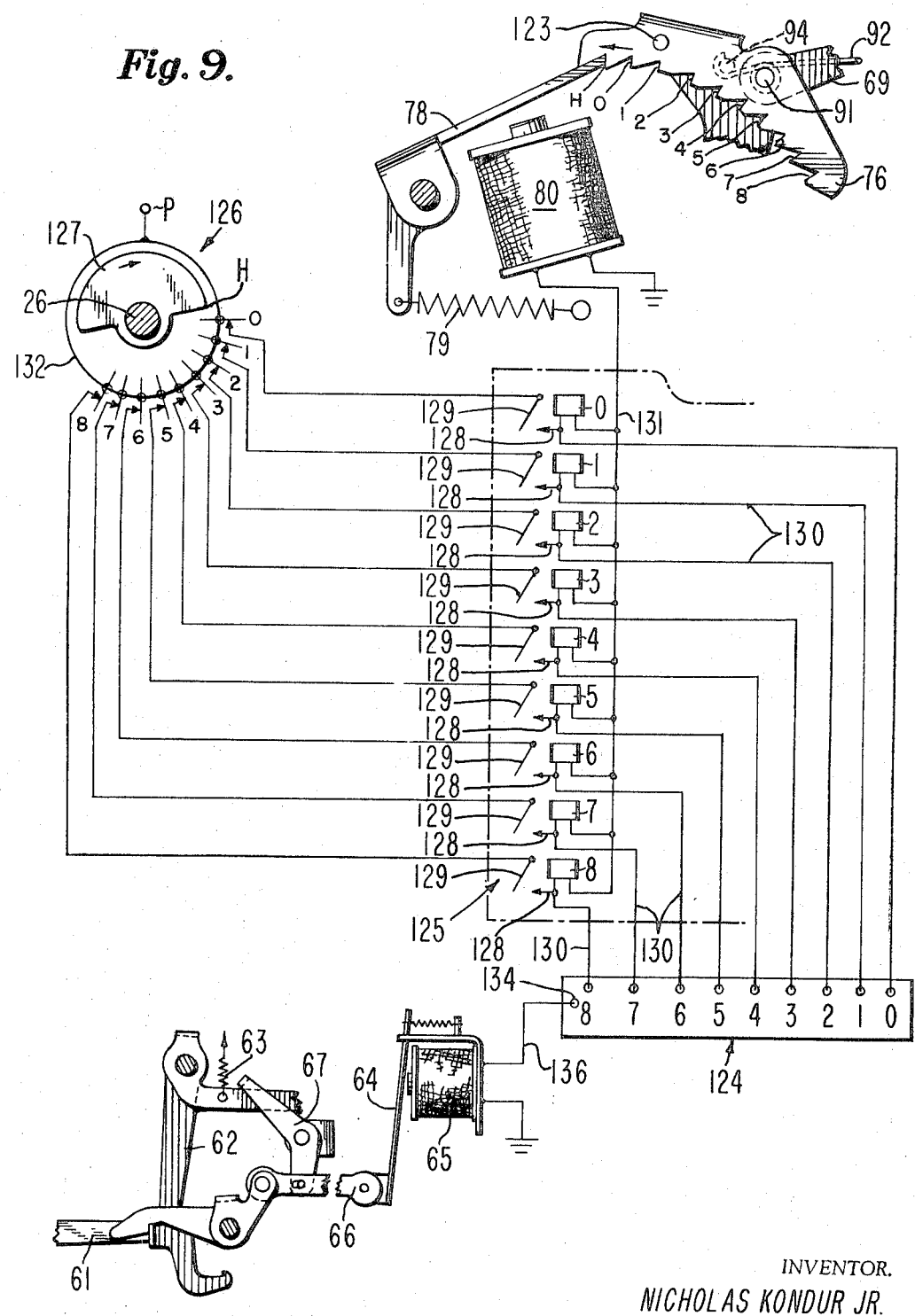
FIG. 9 is a diagrammatic view of a control system for the read-in device.

In connection with the present disclosure of my read-in device, the diagrammatic illustration of FIG. 9 shows a read-in control system comprising, in general, a computer read-out terminal unit 124, one column 125 of a switch matrix and a timer switch mechanism 126. The computer terminal unit 124 has terminals representative of the numerals 0 to 8 and it will be understood that a pulse is received by one of the terminals from the computer, the terminal receiving the pulse being determined of course, by the computer computation. The timer switch mechanism 126 is diagrammatically illustrated as comprising a rotary switch actuator 127 and a plurality of normally closed switch members representative respectively of the numerals 0 to 8. The actuator 127 of the timer 126 is affixed onto the camshaft 26 and thus rotates in synchronization with the arcuate rack 76, the actuator 127 functioning to successively open the switch members. The matrix column 0 to 8 is represented by relays having each the usual coil, a fixed contact member 128, and a movable contact member 129. As shown, the movable contact member 129 is normally in open position. The matrix relay coils have corresponding ends thereof connected, as at 130, to the terminals 0 to 8 respectively, of the terminal unit 124. The other corresponding ends of the matrix relay coils 0 to 8 are connected to a common lead 131 which connects them to the solenoid 80. The matrix fixed contact members 128 are connected respectively to the leads 130 and therefore to the computer terminals 0 to 8. Further, the matrix relay movable contact members 129 are connected by leads to the 0 to 8 switch members of the timer 126. The timer switch members 0 to 8 are connected to a common conductor 132 which is connected to an electrical source of power P. Also an output terminal 134 of the computer is connected by a lead 136 to the solenoid 65 so that upon completion of a computation by the computer, a pulse will energize solenoid 65 and initiate a cycle of operation of the machine camshaft 26.

*Operation*

Assume that the operating parts of the apparatus are in the normal or starting positions shown in FIG. 1 and the computer has completed a computation which calls for the printing of "0." A pulse at the "0" computer terminal energizes the matrix relay coil "0" and through conductor 131 energizes the relay 80. At the same time, the energization of the matrix relay coil "0" closes its contacts and the following holding circuit for relay 80. From the power source P through the "0" timer switch, the closed contacts of the "0" matrix relay and lead 131 through the relay 80 to ground. The "0" relay, of the rows of relays, is energized in turn, the relay 80 whereupon, the clapper 78 is retracted from the "home" abutment of the arcuate rack to release the rack. Also, an output signal from the computer 124 energizes the clutch trip solenoid 65 to initiate a cycle of operation of the camshaft 26. As the camshaft 26 rotates, the cam roller 118 strikes the arm of cam follower lever 112 and through the link 110 pivots the stop member 100 counter-clockwise to place the projection 104 forwardly of the abutment 70 to prevent forward movement of the slide member 38. Simultaneously with the setting of the stop arm 100 by the cam roller 118, the cam 87 pivots the cam follower lever 88 and through link 89, pivots arm 86 and thus arm 85 counterclockwise which allows the spring 81 to rock the arm 75 counterclockwise as pin 84 tends to move away from arm 82. Also rotating with the camshaft 26 is the timer switch actuator 127, which operates in synchronization with the stop member 100 and the rocking of the arcuate rack 76 forward, to open the timer "0" switch. The opening of the timer "0" switch breaks the aforementioned holding circuit which deenergizes the matrix relay coil "0" and therefore the relay 80 so as to release the clapper 78 in time to stop the arcuate rack 76 with pin 124 beneath the lug 122, as shown in FIG. 3. This prevents the stop member 100 from returning to its starting position and thus prevents forward movement of the amount slide member 38 by engagement by abutment 70. Further, the bail 45 is moved forwardly by the cams 44, cam follower 46 and link 48 of FIG. 7. Forward movement of the bail 45 pivots the pawl 49 forwardly and upwardly until the pin 53 limits against the upper end of the arcuate slot 52. This moves the rack 37 forwardly to rotate pinion 36 to raise the bar 34 a distance to position the zero print element at the print line of the platen 22. As the camshaft approaches 180° of the cycle of its operation, the hammer 32 is actuated to print the "0" and the operating parts of the mechanisms are thereafter returned to their normal or starting positions.

As another example of the operation of the read-in device, assume that the output of the computer calls for the printing of the digit "8." As before, a signal pulse from the computer 124 energizes the solenoid 65 to initiate a cycle of operation of the camshaft 26 and a pulse from the computer output "8" energizes the relay 80 to release the arcuate rack 76. As a consequence, the stop member 100 and the arcuate rack are rocked counterclockwise and when the timer switch actuator 127 opens the "8" switch of the timer, the solenoid 80 is deenergized and the clapper engages the "8" abutment on the arcuate rack 76. In this position of the rack 76, the stop member 69 has been preset in position to stop the slide member 38 in the "8" position. During this operation, the slide member 38 and the rack 37 move together to raise the "8" print element to the printing line. This occurs for all positions with the exception of the "0" position. The term "preset" means that for positions 1 to 8, the stop member 69 has been moved to the selected one of the positions before the cam 44 releases the amount slide 38.

What is claimed is:

1. In a data processing machine, a data rack mounted for movement along a path of travel and arrestable in any one of a number of data representing positions, a first cyclically operable means operable to effect movement of said data rack along the path of travel, a movable stop rack mounted along the path of travel of said data rack and having a plurality of abutments representative of said data rack positions, a second cyclically operable means operatively connected to said stop rack and operable to effect movement of the latter prior to movement of said data rack by said first cyclically operable means, a first stop member normally biased to a retracted position and releasable to engage a selected one of said abutments to stop said rack, a third cyclically operable means operable to release said stop member and activate said first and second cyclically operable means, and a second stop member carried by said stop rack and positionable in the path of movement of said data rack at a position corresponding to the data representing abutment engaged by said first stop member.

2. A device for stopping a movable data rack in any one of a number of data representing positions comprising supporting means, a rack pivotally mounted on said supporting means and having a plurality of abutments representative of different data information, said rack having a home position and pivotal therefrom along a path of travel, a first stop member operable in timed relation to the movement of said rack to engage a predetermined one of said abutments to stop the rack, and a second stop member carried by said rack and movable therewith from a retracted position to an effective stop position corresponding to the abutment engaged by said first stop member.

3. A device of the character defined by claim 1 in which the second stop member is pivotal on said rack and biased to rotate in the same direction as said rack on pivoting of the rack from home position, and a guide member engaged by said second stop member.

4. A device for stopping a data rack in any one of a number of data representing positions comprising supporting means, a rack pivotally mounted on said supporting means and having a plurality of abutments representing digits of the decimal system including an abutment representing zero, said rack movable from a home position, means operable to move said rack, a stop member activatable to engage said zero abutment to stop said rack, a second stop member pivotal on said supporting means from a retracted to a stop position, and a holder carried by said rack and movable into abutting relation with said second stop member as said first stop member engages the zero abutment on said rack.

References Cited
UNITED STATES PATENTS

| | | | |
|---|---|---|---|
| 2,822,752 | 2/1958 | Bradshaw et al. | 101—93 |
| 3,009,633 | 11/1961 | Dilks et al. | 235—61 |
| 3,088,662 | 5/1963 | Spingies et al. | 235—61 |
| 3,149,225 | 9/1964 | Siegel | 235—61.6 |

RICHARD B. WILKINSON, *Primary Examiner,*

S. A. WAL, *Assistant Examiner,*